(12) United States Patent
Rao

(10) Patent No.: US 6,187,225 B1
(45) Date of Patent: Feb. 13, 2001

(54) BLUE PHOSPHOR FOR PLASMA DISPLAY AND LAMP APPLICATION AND METHOD OF MAKING

(75) Inventor: Ravilisetty P. Rao, Highland, NY (US)

(73) Assignee: Matsushita Electric Industrial Company, Ltd., Kadoma Osaka (JP)

(*) Notice: Under 35 U.S.C. 154(b), the term of this patent shall be extended for 0 days.

(21) Appl. No.: 09/345,083

(22) Filed: Jun. 30, 1999

Related U.S. Application Data (63) Continuation-in-part of application No. 09/110,500, filed on Jul. 6, 1998, now Pat. No. 5,989,454.

(51) Int. Cl.⁷ ............................. C09K 11/70; C09K 11/71
(52) U.S. Cl. ......................... 252/301.4 R; 252/301.4 H; 252/301.4 P
(58) Field of Search ................. 252/301.4 R, 301.4 P, 252/301.4 H (56) References Cited

U.S. PATENT DOCUMENTS

| | | | |
|---|---|---|---|
| 3,211,666 | 10/1965 | McAllister | 252/301.4 |
| 3,507,804 | 4/1970 | Ropp | 252/301.4 |
| 4,423,349 | 12/1983 | Nakajima et al. | 313/487 |
| 4,891,550 | 1/1990 | Northrop et al. | 313/487 |
| 5,091,110 | 2/1992 | Fan et al. | 252/301.4 |
| 5,154,852 | 10/1992 | Chau | 252/301.4 |
| 5,340,556 | 8/1994 | Collin et al. | 423/263 |
| 5,651,920 | 7/1997 | Chau et al. | 252/301.4 |
| 5,746,944 | 5/1998 | Braconnier | 252/301.4 |
| 5,747,100 | 5/1998 | Peterson | 427/64 |
| 5,801,483 | 7/1998 | Watanabe et al. | 313/485 |
| 5,989,454 | * 11/1999 | Rao | 252/301.4 P |

FOREIGN PATENT DOCUMENTS

WO 99/21938   5/1999   (WO).

* cited by examiner

Primary Examiner—C. Melissa Koslow
(74) Attorney, Agent, or Firm—Ohlandt, Greeley, Ruggiero & Perle, L.L.P.

(57) ABSTRACT

A stable phosphor complex or blend includes a lanthanum phosphate phosphor with $Tm^{3+}$ as an activator, $Li^+$ and an optional amount of an alkaline earth element ($AE^{2+}$) as a coactivator, having the empirical formula:: $(La_{1-x-z}Tm_xLi_yAE_z)PO_4$, wherein $0.001 \leq x \leq 0.05$, $0.01 \leq y \leq 0.05$, and $0 \leq z \leq 0.05$; and 15 to 30% by weight of either: (i) divalent europium-activated barium, magnesium, aluminate (BAM), having an empirical formula: $(Ba_{1-x}Eu_x)O\ Mg_yO\ (Al_2O_3)_z$, wherein $0.005 \leq x \leq 0.05$ and $1 \leq y \leq 2$; or (ii) divalent europium-activated barium, magnesium, lanthanum aluminate (BLMA), having an empirical formula: $(Ba_{1-x}Eu_x)O\ Mg_yO\ (Al_{2-v}LA_vO_3)_z$, wherein $0.005 \leq x \leq 0.05$, $1 \leq y \leq 2$, $5 \leq z \leq 7$ and $0.1 \leq v \leq 1$; or (iii) divalent europium activated alkaline earth chloro apatite (AECAP) having an empirical formula: $(x.Sr, y.Ba, z.Cz, u.Mg)_5(PO_4)_3Cl$, wherein $x+y+z+u=0.1$, $0 \leq x \leq 1.0$, $0 \leq y \leq 1.0$, $0 \leq z \leq 1.0$ and $0 \leq u \leq 1.0$; or (iv) divalent europium-activated calcium chloro borate (CCB) having an empirical formula; $(Ca_{5-x}Eu_x)B_5O_9Cl$, wherein $0.005 \leq x \leq 0.05$.

17 Claims, 7 Drawing Sheets

BLUE PHOSPHOR FOR PLASMA DISPLAY AND LAMP APPLICATION AND METHOD OF MAKING

This application is a Continuation-in-Part of U.S. patent application Ser. No. 09/110,500 filed Jul. 6, 1998, now U.S. Pat. No. 5,989,454.

FIELD OF THE INVENTION

This invention relates to an improved blue-emitting phosphor complex or blend and, more particularly to a complex phosphor mixture that includes a first phosphor that emits both ultra violet (UV) and visible light after excitation from a vacuum UV (VUV) source, and a second phosphor that is excitable by both VUV and UV.

BACKGROUND OF THE INVENTION

Plasma display panels (PDP), as used in direct television and high definition television applications, conventionally use di-valent europium activated barium magnesium aluminate (BAM) phosphor as a blue emitting component due to its availability and high quantum efficiency. However, compared with other phosphors such as $Eu^{3+}$ (red) and $Tb^{3+}$ (green) activated yttrium, gadolinium borate-based phosphors or Mn activated zinc silicate, BAM exhibits a wide spectrum of emission with poor color purity and low lifetime under a VUV flux.

Lifetime of a plasma display is directly related to the performance of phosphors used in the display. Therefore, lifetime of phosphors is of concern in selecting suitable phosphors. Displays for consumer and commercial applications should exhibit lifetimes on the order of 30,000 hours of operation. Therefore, considerable effort has been made to develop new phosphors to replace BAM and to provide improved performance characteristics.

$Tm^{3+}$ activated lanthanum phosphate is one candidate that has been investigated by Applicant herein and is described in the parent Application hereof, i.e. U.S. patent application Ser. No. 09/110,500, now U.S. Pat. No. 5,989,454. The aforesaid phosphor exhibits two narrow peaks in the UV region (340 to 370 nm) and a visible peak at 452 nm. The phosphor's brightness in the visible region, however, is not able to meet current brightness requirements.

Combinations of UV excitable light-emitting phosphors and UV light emitting phosphors are known in the art. U.S. Pat. No. 5,747,100 to Peterson teaches a method of making a low voltage phosphor for field emission displays by forming a diffusion barrier of UV-emitting material on the UV excitable phosphor. In lamp applications, UV emitting phosphors are blended with UV excitable phosphors to improve the performance of broad spectrum lamps. For example, U.S. Pat. No. 4,891,550 to Northrop et al. describes a phosphor blend having four different phosphors covering the visible and partially the UV spectra (5%–8%). The object of the phosphor blend is to produce UV light in a manner close to sunlight.

U.S. Pat. No. 5,801,483 to Watanabe et al. describes a phosphor blend for a fluorescent lamp which converts the ultraviolet rays from the fill gas into visible light and UV radiation in the 320–410 nm range. The luminescent compound is a blend of red emitting trivalent europium activated yttrium oxide, blue emitting barium magnesium aluminate activated by divalent europium, green emitting lanthanum cerium phosphate activated by trivalent terbium and UV emitting phosphors of either barium silicate activated by divalent lead or divalent europium activated strontium magnesium pyrophosphate, or trivalent cerium activated yttrium phosphate.

Most of the work reported on lanthanum phosphate based phosphors has been related to fluorescent lamp applications as an efficient green phosphor and the performance of the phosphor therein. Development of terbium and cerium activated lanthanum phosphate is well documented in numerous patents. Different methods of preparation and the introduction of various impurities have been tried in attempts to improve the life and performance of the lamp.

U.S. Pat. No. 3,211,666 to William A. McAllister discloses use of lanthanum phosphate activated with various rare earths, for high pressure mercury vapor lamps and CRTs. Synthesis of particular phosphors was made by mixing one mole of lanthanum oxide with two moles of ammonium dihydrogen ortho phosphate and 0.08 mole of rare earth oxide and fired in a nitrogen atmosphere at a temperature 1100° C. for 90 minutes.

In U.S. Pat. No. 3,507,804, rare earth (Ce, Tb, Eu, Tm, Yb, Pr, Nd) activated Y,Gd,La phosphate was synthesized by reacting respective solutions with phosphoric acid solution. The dried precipitates were fired in air at 1150–1200° C. for three to four hours.

PCT patent WO 99/21938 describes the preparation of lanthanum phosphate comprising thulium from respective salts and phosphoric acid in presence of flux at 1000° C.

U.S. Pat. No. 4,423,349 to Nakajima et. al. describes two methods of synthesizing the above phosphor. In the first method, lanthanide carbonates are reacted with phosphoric acid at 75° C. and then calcinated at 1150° C. for 75 minutes. In the second method, coprecipitated lanthanide oxalates are oxidized to a single phase lanthanide oxide at 800° C. Diammonium phosphate is mixed with the oxide and fired at 1200° C. Boron oxide or ammonium borate is also added before calcination to enhance the reaction and also improve the brightness.

U.S. Pat. No. 5,091,110 to Albert et.al. discloses a method of making lanthanum cerium terbium phosphate phosphor in a two step process. The method comprises formation of an aqueous solution of lanthanide nitrates and an aqueous solution of diammonium phosphate and combining both to coprecipitate a lanthanum terbium cerium phosphate followed by firing the mixture at higher temperatures to form the phosphor. Boron phosphate is used as the phosphate source because it is stable at elevated temperatures (see U.S. Pat. No. 5,132,042). Lithium carbonate is also used as a flux forming compound to improve the solubility of the lanthanide phosphate in the boron oxide solution formed during the process (see U.S. Pat. No. 5,154,852).

Terbium, cerium activated lanthanum phosphate is also prepared by reacting monoammonium phosphate solution and respective rare earth nitrate solutions (U.S. Pat. No. 5,340,556 to Collin et al.). The resultant powder is calcined at 900° C. in air or in a non-reducing atmosphere to obtain a phosphor with 250 nm compact aggregates. From XRD analysis, it is found that the resultant phosphor powder has monoclinic crystal structure. Small size phosphor particles could be prepared by adding excess boric acid and lithium carbonate as a flux in the starting mixture before firing (see U.S. Pat. No. 5,651,920 to Chau et al.).

U.S. Pat. No. 5,746,944 to Braconnier et al. disclose a lanthanum/cerium/terbium mixed green phosphor that is directly precipitated by reacting a first solution of soluble lanthanum, cerium and terbium salts with a second solution containing phosphate ions.

HDTV and similar type display devices should have high resolution and high brightness to meet expected performance. This can be achieved currently only with thin phosphor screens consisting of very small phosphor particles (0.5–2 microns) in a close rib structure. Screens with small particles have higher packing density and also need lesser binder content. It is known that terbium and cerium activated lanthanum phosphate have high quantum efficiency, better stability at operating temperatures and long lifetime, particularly under 254 nm UV excitation (compact fluorescent lamps). However, very limited information is available on the preparation and luminescent studies on thulium activated lanthanum phosphate phosphors.

SUMMARY OF THE INVENTION

A stable phosphor complex or blend includes a lanthanum phosphate phosphor with $Tm^{3+}$ as an activator and $Li^+$ and/or either of alkaline earths (Ba, Sr, Ca or Mg) as coactivators, having the empirical formula:

$$(La_{1-x-y-z}Tm_xLi_yAE_z)$$

wherein: $0.001 \leq x \leq 0.05$, $0.01 \leq y \leq 0.05$, and $0 \leq z \leq 0.05$; and 15 to 30% by weight of either:

(i) divalent europium-activated barium, magnesium, aluminate (BAM), having an empirical formula: $(Ba_{1-x}Eu_x)O \cdot Mg_yO \cdot (Al_2O_3)_z$, wherein $0.005 \leq x \leq 0.05$, $1 \leq y \leq 2$ and $5 \leq z \leq 7$; or (ii) divalent europium-activated barium, magnesium, lanthanum aluminate (BLMA), having an empirical formula: $(Ba_{1-x}Eu_x)O \cdot Mg_yO \cdot (Al_{2-v}La_vO_3)_z$, wherein $0.005 \leq x \leq 0.05$, $1 \leq y \leq 2$, $5 \leq z \leq 7$ and $0.1 \leq v \leq 1$; or (iii) divalent europium activated alkaline earth chloro apatite (AECAP) having an empirical formula: $(xSr, yBa, zCa, uMg)_5(PO_4)_3Cl$, wherein $x+y+z+u=1.0$, $0<x<1.0$, $0 \leq y \leq 1.0$, $0 \leq z \leq 1.0$ and $0 \leq u \leq 1.0$; or (iv) divalent europium-activated calcium chloro borate (CCB) having an empirical formula; $(Ca_{5-x}Eu_x)B_5O_9Cl$, wherein $0.005 \leq x \leq 0.05$.

DETAILED DESCRIPTION OF THE INVENTION

Lanthanum Phosphate Phosphor (Hereafter LPT)

The phosphors disclosed below are synthesized by various processes, viz., solid state reactions and sol-gel/xerogel processes depending on the required particle size distribution. The sol-gel/xerogel process is used for preparing sub-micron size particles (0.05 to 1 microns) and the solid state reaction is for normal size particles (0.1 to 4 microns).

The Sol-gel/xerogel process offers advantages over conventional methods in the synthesis of fine powders and particularly phosphor materials. Since all of the starting materials are mixed at the molecular level in a solution, a high degree of homogeneity is achievable. Doping of impurities (activators/coactivators/sensitizers) through solutions is straightforward and effective. The pores in properly dried xerogels are often extremely small and the components of a homogenous gel are intimately mixed. The surface area of powders produced from sol-gel is very high, leading to lower processing temperatures.

Impurities, other than activators and coactivators, left in phosphor materials from conventional synthesis typically degrade the performance and/or lifetime of phosphors used for display applications. As phosphor materials are extremely sensitive to impurities, even in ppb levels, the sol-gel/xerogel process along with the final low reaction temperature, minimizes the incorporation of impurities.

As the size of the phosphor particle decreases, the probability of electron and hole (e-h) capture to the dopant(s) increases and the e-h localization enhances the recombination rate via the dopant(s). The optimum dopant concentration level can be further increased with small particle size.

The blue phosphor of the present invention employs $Tm^{3+}$, $AE^{2+}$ and $Li^+$ doped lanthanum phosphate phosphor produced by sol-gel/xerogel and solid state methods. More specifically, the present invention provides a process for forming a $Tm^{3+}$, $AE^{2+}$ (Ba, Sr, Ca or Mg) and $Li^{1+}$ doped lanthanum phosphate phosphor having the empirical formula:

$$(La_{1-x-y-z}Tm_xLi_yAE_z)PO_4$$

wherein: $0.001 \leq x \leq 0.05$; $0.01 \leq y \leq 0.05$; and $0 \leq z \leq 0.05$.

The method includes the steps of:

(1) reacting a dilute solution comprising a source of lanthanum, a source of thulium, a source of lithium, a source of alkaline earth and an organic precursor providing a source of phosphorus, in an acid medium to form a sol, a gel and then a xerogel; and (2) thermally decomposing the powders obtained from (1) above, at a temperature in the range 900 to 1000° C.; or (3) mixing powdered sources of lanthanum, thulium, lithium, optionally an alkaline earth and an inorganic precursor providing a source of phosphorus, to form a mixed powder; and, (4) firing the mixed powder at a solid state reaction temperature (1000 to 1100° C.).

For a display, lifetime is a very critical issue. In most displays and lamps, blue phosphor is a weak component due its shorter lifetime when compared with other phosphors (green and red). Since commercially available divalent europium activated barium magnesium aluminate-based phosphors fail to satisfy the current display lifetime requirements, a new phosphor and its synthesis process that overcomes the above limitations was developed. The small size phosphor particles are particularly suitable for use in applications in which a high packing density is required.

This invention includes a method of synthesizing LPT phosphors incorporating moderate concentrations of activator ion ($Tm^{3+}$) and trace amounts of at least one of Ba, Sr, Ca or Mg and/or $Li^+$. The formation of a solid solution, which is critical, mainly depends upon the reaction temperature and conditions. In a solid state reaction, respective oxides are reacted at higher temperatures in the presence of excess phosphate. At these temperatures, there is every possibility for formation of other phases, such as individual phosphates and unreacted oxides of lanthanum, thulium, etc. Proper doping of activator ions into the lattice of the complex is uncertain. Finally, a high temperature process will lead to growth of larger particles (>5 microns).

The Sol-gel/xerogel process can be divided into two categories; one, an aqueous-based process that starts from a solution of a metal salt and second, an alcohol-based process that starts from a metal alkoxide. Because metal alkoxides are expensive, nitrates of lanthanum and thulium are selected as a metal source and trimethyl phosphate is selected as a phosphate source.

Initially, a trimethyl phosphate stock solution is prepared by mixing trimethyl phosphate and ethanol in 1:10 ratio. To further understand these materials, a number of phosphors were prepared under different conditions. Metal precursors were synthesized by adopting the following route:

The lanthanum hydroxide precursor was prepared by precipitating an aqueous solution of $LaCl_3$ or $La(NO_3)_3$ (0.01M) in water by the addition of a base, such as ammonium hydroxide, to the solution. A gelatinous precipitate with pH=10.0 to 10.4 was obtained. These gels were washed a number of times with DI water to remove counter ions ($NO_3^-$ or $NH_4^+$).

The following sol-gel process was used to form a xerogel product. Required metal solutions were prepared by mixing appropriate amounts of respective metal nitrates in a luke warm DI water to obtain 0.05 to 1.0 M solutions. Stoichiometric quantities of metal (La, Tm, Sr and Li) nitrate or hydroxide solutions and trimethyl phosphate were added together so that the metal to phosphate ratio was always in the range 0.98 to 1.02. The metal/phosphate solution was transferred to a round bottom flask and peptized at 80 to 100° C. for 9 to 18 hours in a stirrer mantle. In the present invention, boric acid has been tried. Boric acid is appropriate as it acts as an acid catalyzer as well as flux during the calcination.

After the pepitization, sol/gels were left in a container until they become a thick gel (5 to 7 days) and then a xerogel. These xerogels, produced by this process were transferred into a lab oven at 60 to 70° C. and left for a day or until a powder was formed upon drying. These powders were transferred into high grade alumina crucibles and subjected to two heat cycles. The samples were soaked for 2 hours at 350° C. and then heated to 800 to 1000° C. for 2 to 12 hours. After cooling to room temperature, a small quantity of water was added. The water pulped the hard mass into fine particles. The fine powder was then washed with deionized water and dried at 100° C. for 4 to 6 hours.

Thermal analysis of phosphor samples containing various proportions of metal provide insight into the reaction kinetics. The data reveals that the samples have undergone two to three successive weight changes into three different temperature regions. The first one, occurring around 100° C., corresponds to loss of free water molecules associated with respective metal salt solutions. The second weight loss, around 200 to 300° C., is due to the loss of $CH_3O$ through oxidation.

Figure 1:
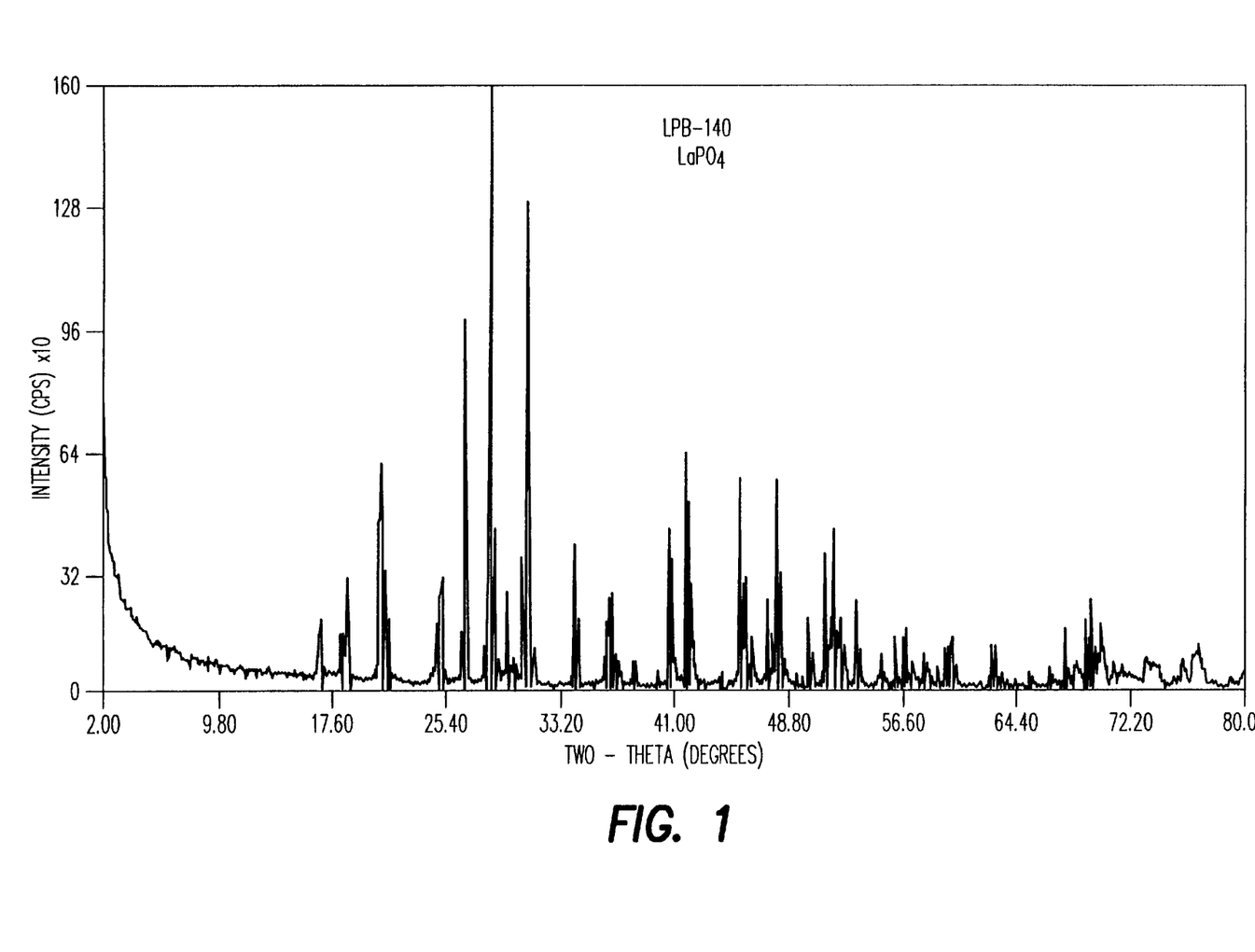
FIG. 1 shows an X-ray diffraction pattern of a $LaPO_4$:Tm, Li phosphor.

X-ray powder diffraction data on samples fired at 1050° C. is shown in FIG. 1. The samples fired below 900° C. show some of the lines corresponding to the lanthanum phosphate phase. All the prominent lines corresponding to lanthanum phosphate phase are observed in samples fired at and above 900° C. This indicates that the samples are completely converted to respective phosphate as no lines corresponding to any of these metal nitrates or oxides are observed. This conclusion is also supported by TGA data. The lines corresponding to metal phosphate phase are more prominent with increasing firing temperatures.

Since the luminescence of a phosphor depends on the shape, size, crystallinity, defects and grain boundaries, the morphology and PSD of all the samples prepared at various conditions were studied. Scanning electron micrographs of phosphor samples prepared at various conditions indicated that the phosphor particles were uniform and exhibited spherical shapes.

Figure 2A:
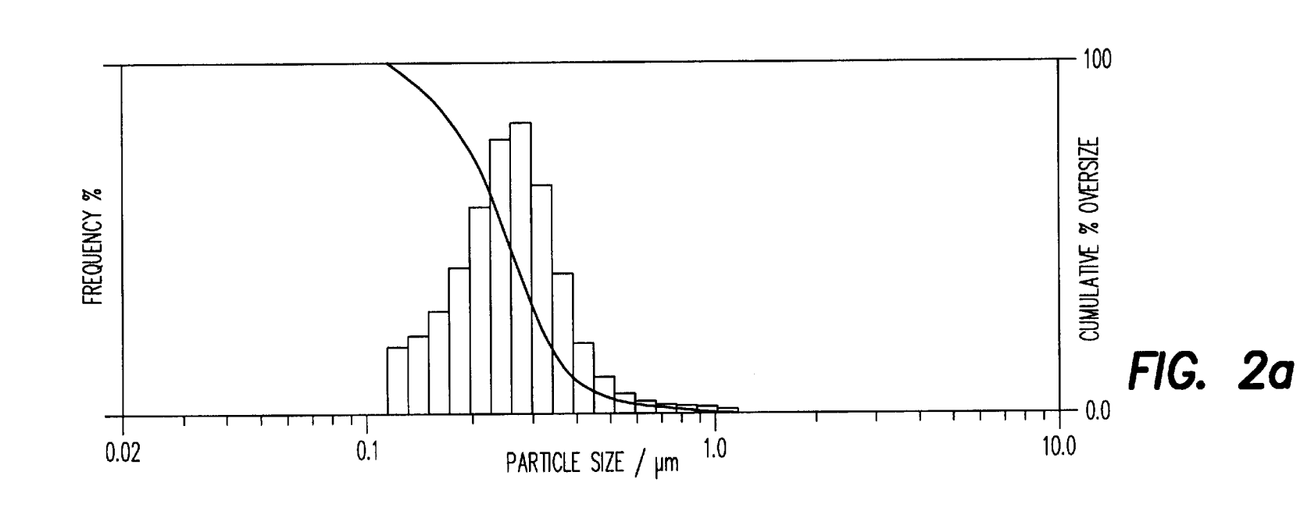
FIG. 2a graphs the particle size distribution $LaPO_4$:Tm,Li phosphors prepared from a sol-gel/xerogel process.
Figure 2B:
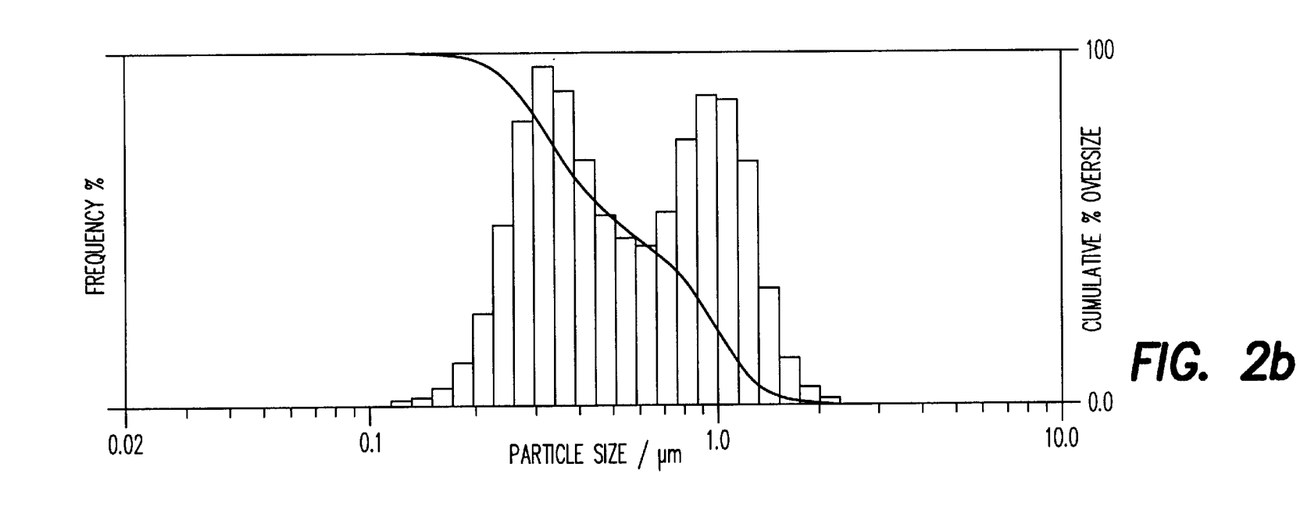
FIG. 2b graphs the particle size distribution $LaPO_4$:Tm,Li phosphors prepared from a solid state process.
Figure 3A:
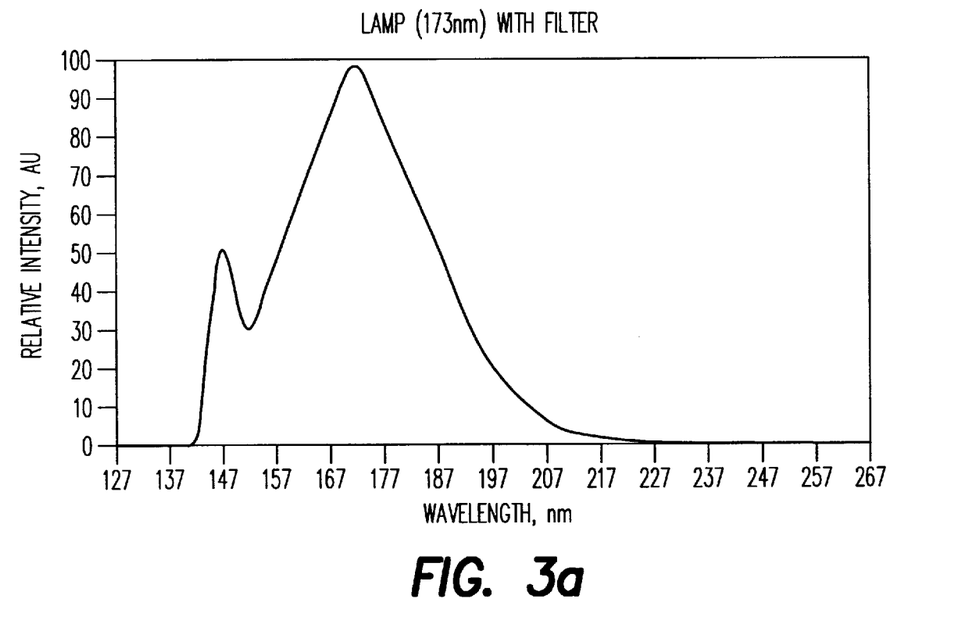
FIGS. 3a and 3b provide spectral distribution of radiation energy from Xe lamps with $MgF_2$ windows and suitable band pass filters at wavelengths of (a) 147 nm and (b) 173 nm.
Figure 3B:
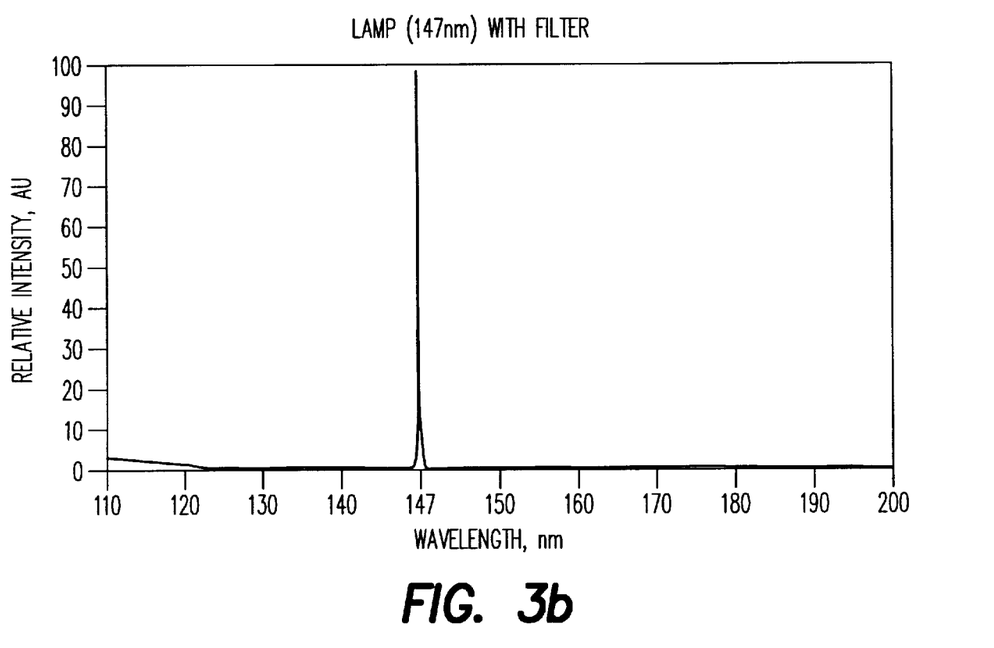

The particle size distribution (PSD) of phosphors prepared from hydroxides and nitrates is shown in FIGS. 2$a$ and 2$b$. The samples were washed with water after calcination to eliminate very small particles (<0.05 microns) as well as organic residues and were allowed to dry. The emission characteristics of these phosphors were carried out on powders, at room temperature.

Figure 4:
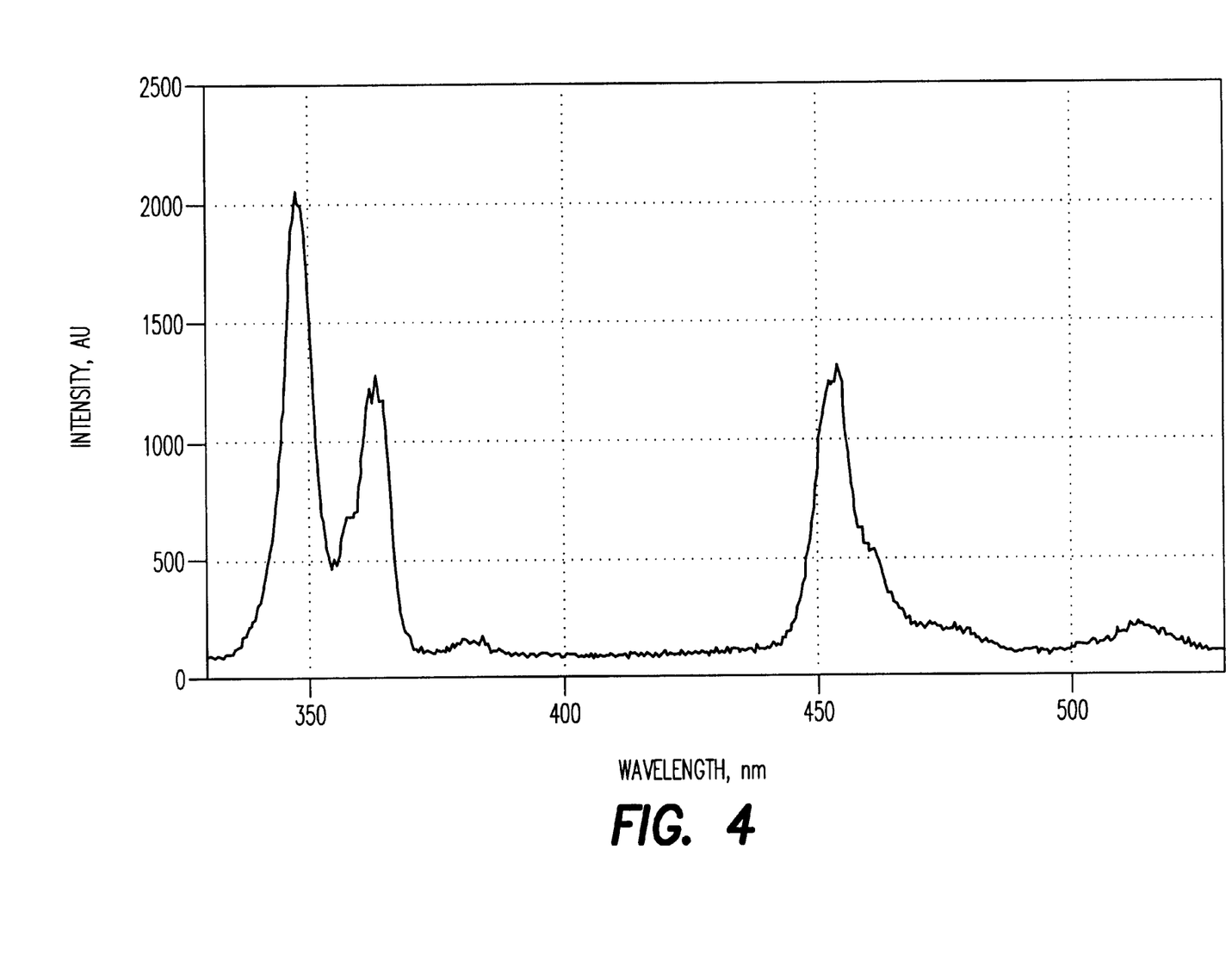
FIG. 4 shows emission spectra of $LaPO_4$:Tm,Li phosphors at 147 nm excitation.
Figure 5:
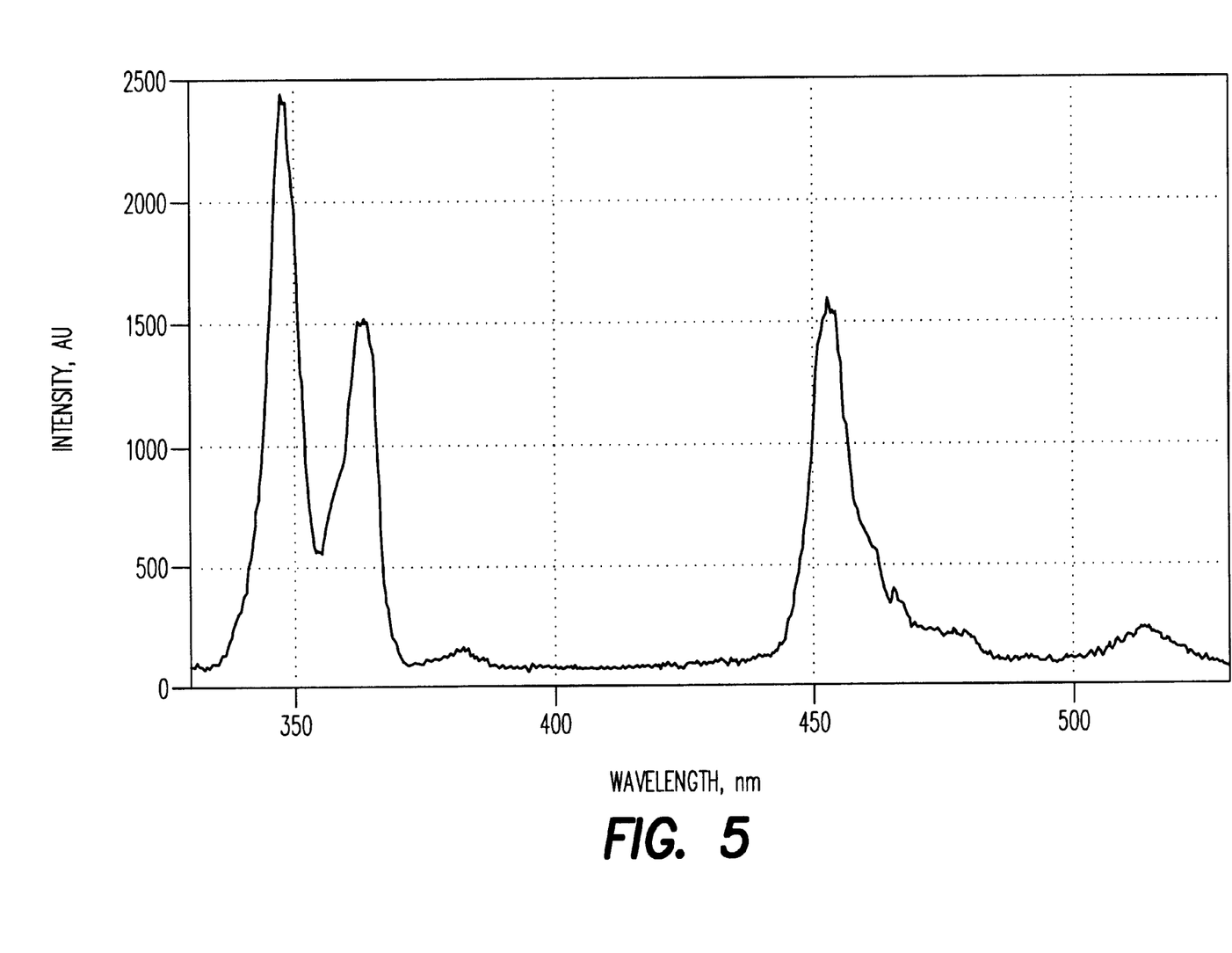
FIG. 5 shows emission spectra of $LaPO_4$:Tm,Li phosphors at 173 nm excitation.

Phosphor samples were exposed to different custom made Xenon lamps corresponding 147 and 173 nm (FIGS. 3$a$, 3$b$), with a $MgF_2$ window and suitable band pass filters. Two emission lines at 360 and 451 nm correspond to the $^1D_2 \rightarrow {}^3H_6$ and $^1D_2 \rightarrow {}^3H_4$ transitions in $(4f)^{12}$ electronic configuration of $Tm^{3+}$ ions. The emission spectra of $Tm^{3+}$ doped lanthanum phosphate phosphors prepared from metal nitrates are shown in FIGS. 4 and 5. The emission lines around 360 nm are not in the visible region but they enhance the color temperature of the phosphor.

A particularly suitable phosphor can contain from about 52.3 wt. % to about 59.34 wt. % of lanthanum, from about 0.06 wt. % to about 2.97 wt. % of thulium, from 0 wt. % to about 0.15 wt. % of lithium, from 0 wt. % to about 1.35 wt. % of either of an alkaline earth (Ba,Sr,Ca,Mg) and about 13.0 wt. % to about 15.5 wt. % of phosphor. All weight percentages are based on the total weight of the phosphor.

Further details will be described with reference to the following examples.

EXAMPLE I

The preparation of thulium doped lanthanum phosphate phosphor employing the hydroxides of lanthanum, thulium, lithium and an acid catalyzer by a sol-gel/xerogel process is described in this example. The following starting materials were used. The amounts of respective hydroxide solution (semi-gels) and phosphate solutions, in volume and percentage by weight per batch, are described in Table I.

TABLE I

| Chemical | Quantity (CC) | Element (Gm) | Mol. % |
| --- | --- | --- | --- |
| Lanthanum Hydroxide (0.01M) | 965 | 1.342 | 96.5 |
| Thulium Hydroxide (0.01M) | 25 | 0.042 | 2.5 |
| Lithium Hydroxide (0.01M) | 10 | 0.0005 | 1.0 |
| Trimethyl Phosphate (0.1M) | 12 | 0.3235 | — |
| Boric Acid (1M) | 12 | 0.13 | — |

The above hydroxide solutions were mixed in a round bottom flask. Required quantities of trimethyl phosphate solution were added slowly to the hydroxide solution while stirring at 45° C. Small quantities (1 to 2 cc) of nitric or hydrochloric acid were added drop wise along with boric acid when the solution attained a maximum required temperature (90–95° C.) and the solution was then peptized at that temperature for about 9–12 hours. A water condenser column was maintained at 20° C. throughout the pepitization by use of a circulating chiller. After cooling the flask to room temperature, the solution (semi-gel) was transferred to a crystallizing dish (3 L capacity) and left in an open atmosphere. After a few days (e.g., 5 to 10 days), the solution became a gel and then a xerogel.

The transparent xerogels were left at 45 to 50° C. for 12 hours in a lab oven. The loose mass from the glass dish was crushed in a glass mortar and pestle. A fine powder was collected into a crucible and fired at 300° C. for 2 hours (rate of heating is 2°/min.) and then 900° C. for 6 hours, with the same rate of heating, in a box furnace. The sample was left in the furnace until it cooled to room temperature.

A hard mass was obtained after cooling. A small quantity of water pulped the hard mass into fine particles. These fine phosphor powders were subjected to ultrasonic agitation in water. Ultrasonic treatment helped to break the clusters into very small particles. After washing with water, these powders were dried at 100° C. for 6 hours. To recover sub-micron size particles (<0.05 micron), the solution with phosphor was centrifuged. Depending on the required amounts, this can be scaled up to ten times or more. Quantitative analysis by CHN analysis and plasma emission spectroscopy of the above phosphor are shown in Table II.

TABLE II

| Element | % by wt. |
| --- | --- |
| C | 0.05 |
| H | 0.00 |
| N | 0.04 |
| $Li_2O$ | 0.06 |
| $P_2O_5$ | 30.40 |
| $La_2O_3$ | 67.38 |
| $Tm_2O_3$ | 2.07 |

The emission characteristics of these phosphors, were studied separately by exciting with 147 and 173 nm excitation sources (Xe lamp), and are given in Table IX below. For comparison, average particle size is also mentioned in the same table.

EXAMPLE II

The preparation of thulium doped lanthanum phosphate phosphor by a sol-gel/xerogel method in accordance with the present invention, employing lanthanum nitrate, thulium nitrate, lithium nitrate and trimethyl phosphate in an acid catalyzer is described in this example. Starting materials used in the present example in grams and percentage by weight are listed in Table III.

TABLE III

| Chemical | Quantity (CC) | Element (Gm) | Mol. % |
| --- | --- | --- | --- |
| Lanthanum Nitrate (0.02M) | 96.5 | 2.683 | 96.5 |
| Thulium Nitrate (0.02M) | 25 | 0.084 | 2.5 |
| Lithium Nitrate (0.02M) | 10 | 0.001 | 1.0 |
| Trimethyl Phosphate (0.1M) | 25 | 0.674 | — |
| Boric Acid (1M) | 25 | 0.27 | — |

The above nitrate solutions were mixed in a round bottom flask. Required quantities of methyl phosphate solution were added slowly to the nitrate solution while stirring at 45° C. The solution was peptized at 90° C. for about 12 hours. The remaining preparative procedure (firing, cooling, pulping, washing and drying) is the same as mentioned in Example I. CHN analysis of the above phosphor is shown in Table IV:

TABLE IV

| Element | % by wt. |
| --- | --- |
| C | 0.07 |
| H | 0.02 |
| N | 0.06 |

The emission characteristics of these phosphors, studied separately by exciting with 147 nm and 173 nm excitation sources (Xe lamp), are given in Table IX. For the purpose of comparison, average particle size of each sample is also mentioned in the same table.

EXAMPLE III

The preparation of thulium doped lanthanum phosphate phosphor by a sol-gel/xerogel method in accordance with the present invention, employing lanthanum nitrate, thulium nitrate, lithium nitrate, strontium nitrate and trimethyl phosphate in an acid catalyzer is described in this example. Starting materials used in the present example in grams and percentage by weight per batch are shown in Table V.

TABLE V

| Chemical | Quantity (CC) | Element (Gm) | Mol. % |
| --- | --- | --- | --- |
| Lanthanum Nitrate (0.02M) | 955 | 2.655 | 95.5 |
| Thulium Nitrate (0.02M) | 25 | 0.084 | 2.5 |
| Lithium Nitrate (0.02M) | 10 | 0.001 | 1.0 |
| Strontium Nitrate (0.02M) | 10 | 0.013 | 1.0 |
| Trimethyl Phosphate (0.1M) | 25 | 0.674 | — |
| Boric Acid (1M) | 25 | 0.27 | — |

The above nitrate solutions were mixed in a round bottom flask. Required quantities of methyl phosphate solution were added slowly to the nitrate solution while stirring at 45° C. The solution was peptized at 90° C. for about 12 hours. The remaining preparative procedure (firing, cooling, pulping, washing and drying) was the same as mentioned in Example I. CHN analysis of the above phosphor is shown in Table VI:

TABLE VI

| Element | % by wt. |
| --- | --- |
| C | 0.04 |
| H | 0.00 |
| N | 0.07 |

The emission characteristics of these phosphors, studied separately by exciting with 147 and 173 nm excitation sources (Xe lamp), are given in Table XI. For the purpose of comparison, average particle size of each sample is also mentioned in the same table.

EXAMPLE IV

The preparation of thulium doped LPT phosphor by a solid state reaction in accordance with the present invention, employing lanthanum nitrate, thulium nitrate, lithium nitrate, ammonium dihydrogen phosphate and boric acid is described in this example. Starting materials used in the present example in grams and percentage by weight per batch are shown in Table VII.

TABLE VII

| Chemical | Quantity (Gm) | Element (Gm) | Mol. % |
|---|---|---|---|
| Lanthanum Nitrate | 8.36 | 2.683 | 96.5 |
| Thulium Nitrate | 0.18 | 0.084 | 2.5 |
| Lithium Nitrate | 0.14 | 0.001 | 1.0 |
| Ammonium dihydrogen Phosphate | 3.2 | 0.8585 | — |
| Boric Acid | 1.0 | 0.063 | — |

The above nitrates, ammonium dihydrogen phosphate and boric acid powders are mixed and ground in an alumina mortar with the help of a pestle. The resultant mixture is fired at a high temperature 1000–1100° C. The remaining preparative procedure (cooling, pulping, washing and drying) is the same as mentioned in Example I. CHN analysis of the above phosphor is shown in Table VIII:

TABLE VIII

| Element | % by wt. |
|---|---|
| C | 2.92 |
| H | 0.09 |
| N | 0.15 |

The emission characteristics of these, studied separately by exciting with 147 nm and 173 nm excitation sources (Xe lamp), are given in Table IX. For comparison, average particle size is also mentioned in the same table.

TABLE IX

| Phosphor | Relative Intensity @ Excitation | | Color Coordinates | | Particle Size |
|---|---|---|---|---|---|
| | 147 nm | 173 nm | x | y | ($\mu$m) |
| Example - 1 | 97 | 98 | 0.1442 | 0.0371 | 0.05–1.0 |
| Example - 2 | 100 | 100 | 0.1441 | 0.0371 | 0.05–2.0 |
| Example - 3 | 98 | 98 | 0.1444 | 0.0369 | 0.05–2.0 |
| Example - 4 | 94 | 97 | 0.1440 | 0.0370 | 0.05–3.0 |

As the data of Table IX demonstrates, the phosphors of Examples 1 through 4, formed by sol-gel/xerogel and solid state reaction processes of the present invention, provide various particle size ranges, while also generally providing a higher level of color saturation, brightness, shorter persistence and longer lifetime.

Phosphor Complex/Blend (LPT, BAM, BLMA, AECP or CCB)

This description details a phosphor complex or a blend containing LPT, incorporating moderate concentrations of activator ion ($Tm^{3+}$) and trace amounts of $AE^{2+}$ and/or $Li^+$ and a small amount of divalent europium activated barium, lanthanum, magnesium aluminate (BLMA), alkaline earth halo phosphate (AECP) or calcium chloro borate (CCB).

$Tm^{3+}$ activated/doped phosphors, particularly lanthanum phosphate, exhibit two narrow band emission peaks at 360 and 451 nm, corresponding to the $^1D_2 \rightarrow {}^3H_6$ (UV) and $^1D_2 \rightarrow {}^3H_4$ (visible) after excitation with VUV. For display applications, the UV portion of the spectrum is of no use.

Without considering the UV portion of the spectrum, the phosphor efficiency is very low. This system of phosphors can be made more efficient, if use can be made of the UV portion of the emitted spectrum, i.e., by finding phosphors that can be excited by VUV as well as UV. It has been determined that by blending a $Tm^{3+}$ activated phosphor with a small portion of another phosphor such as $Eu^{2+}$ activated BLMA or AECP, the overall efficiency of the phosphor can be improved substantially. In the luminescence process, UV photons emitted by $Tm^{3+}$ centers are absorbed by the second phosphor along with the VUV photons from a Xe plasma and then emit visible radiation around 452 nm.

A phosphor complex has been made by coating a thin layer of BAM or BLMA or AECP on LPT phosphor particles, drying the coated LPT phosphor and thermally decomposing the coated LPT phosphor in a forming gas to create a phosphor complex, such as, an LPT/BAM phosphor complex, an $Eu^{2+}$ activated chloro apatite phosphor complex or an LPT/BLMA phosphor complex. For example, AECP gels were prepared by the following method:

Initially, trimethyl phosphate stock solution was prepared by mixing trimethyl phosphate and ethanol in 1:10 ratio. To further understand these materials, a number of phosphors were prepared under different conditions. Metal precursors were synthesized by mixing appropriate amounts of respective metal chlorides in lukewarm DI water to obtain 0.05 to 0.5 M solutions. Stoichiometric quantities of an alkaline earth metal and europium chloride or hydroxide solutions and trimethyl phosphate were added. The metal/phosphate solution was transferred to a round bottom flask and peptized at 80 to 100° C. for 10 to 20 hours in a stirrer mantle. A small quantity of HCl acid was used as it acts as an acid catalyzer as well as an halogen provider.

After the peptization, required amounts of xerogels were mixed with $Tm^{3+}$ activated LPT powders (particle sizes in the 1.0 to 2.0 micron range) and rolled in a open container for several days or until they become powders. These powders were transferred into a high grade alumina boat and subjected to two heat cycles. The sample was soaked for 2 to 4 hours at 350° C. and then heated to 900 to 1000° C. for 2 to 12 hours in air. After crushing the powders, the mass was reheated at 1000° C. for 2 to 4 hours in presence of forming gas (4.5% $H_2$ and remaining $N_2$). After cooling to room temperature, the fine powders were then washed with deionized water and dried at 100° C. for 4 to 6 hours.

By blending various quantities of $Eu^{2+}$ activated BAM or BLMA or AECP or CCB in the range 15 to 30% by weight with $Tm^{3+}$ activated lanthanum phosphate phosphors, the optimization of required BAM or BLMA or AECP or CCB was achieved. The spectral data on all these blends showed that 18% to 25% by weight $Eu^{2+}$ activated phosphors is sufficient to absorb all the UV energy emitted by lanthanum phosphate ($Tm^{3+}$) phosphor and to convert that energy to visible emission in the blue region.

Figure 6:
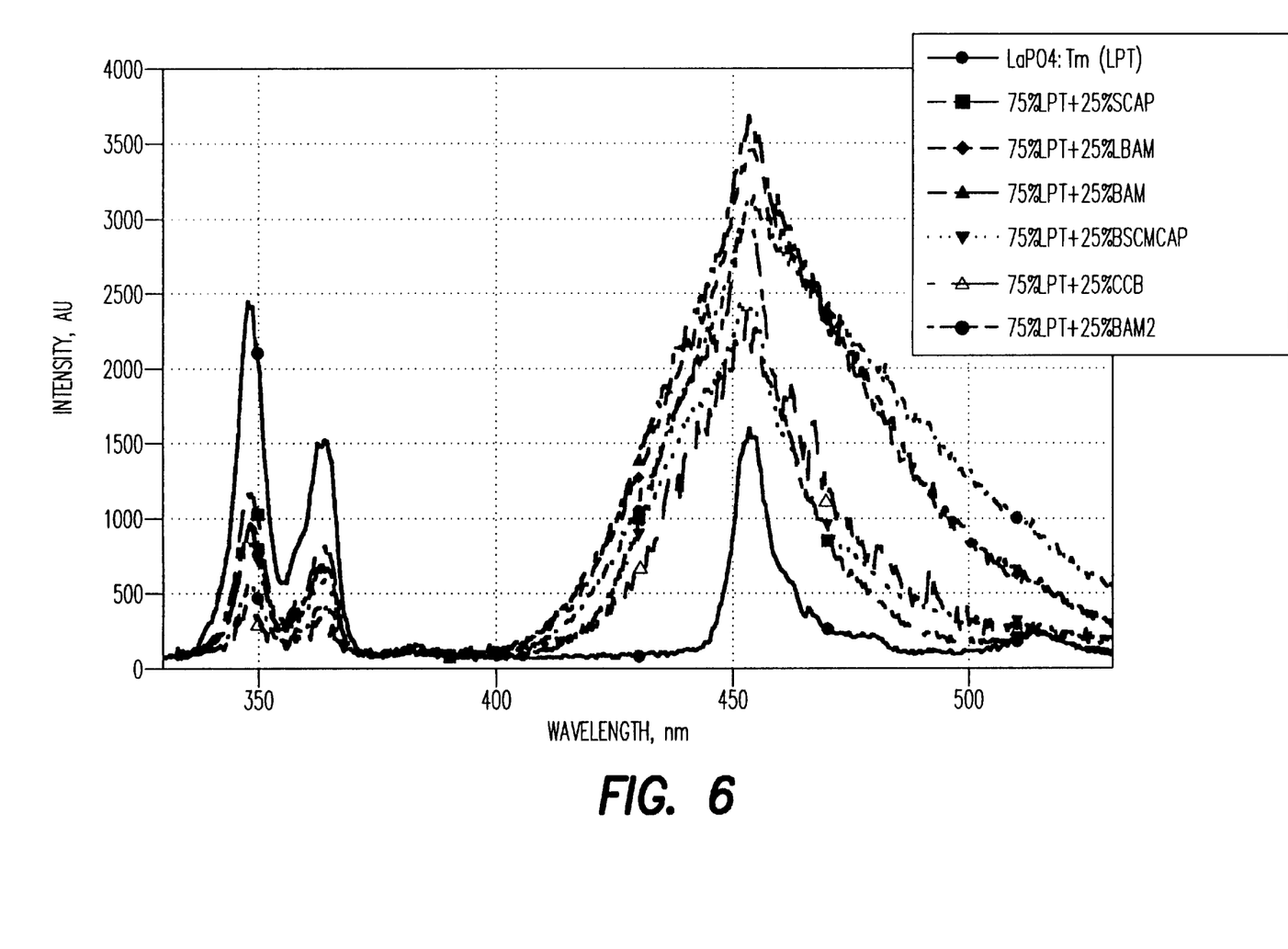
FIG. 6 shows the emission spectra of $LaPO_4$:Tm,Li (LPT) and phosphor blend made out of 75% of LPT and 25% of di-valent europium activated either $BaMgAl_{10}O_{17}$ (BAM) or $BaMg_2Al_{16}O_{27}$ (BAM2) or $BaMgLaAl_9O_{17}$, (BLMA) or $Sr_5(PO_3)_3Cl$ (SCAP) or $(Sr,Ca,Ba,Mg)_5(PO_4)_3Cl$ (BSCMCAP) or $Ca_5B_5O_9Cl$ (CCB) at 147 nm excitation.
Figure 7:
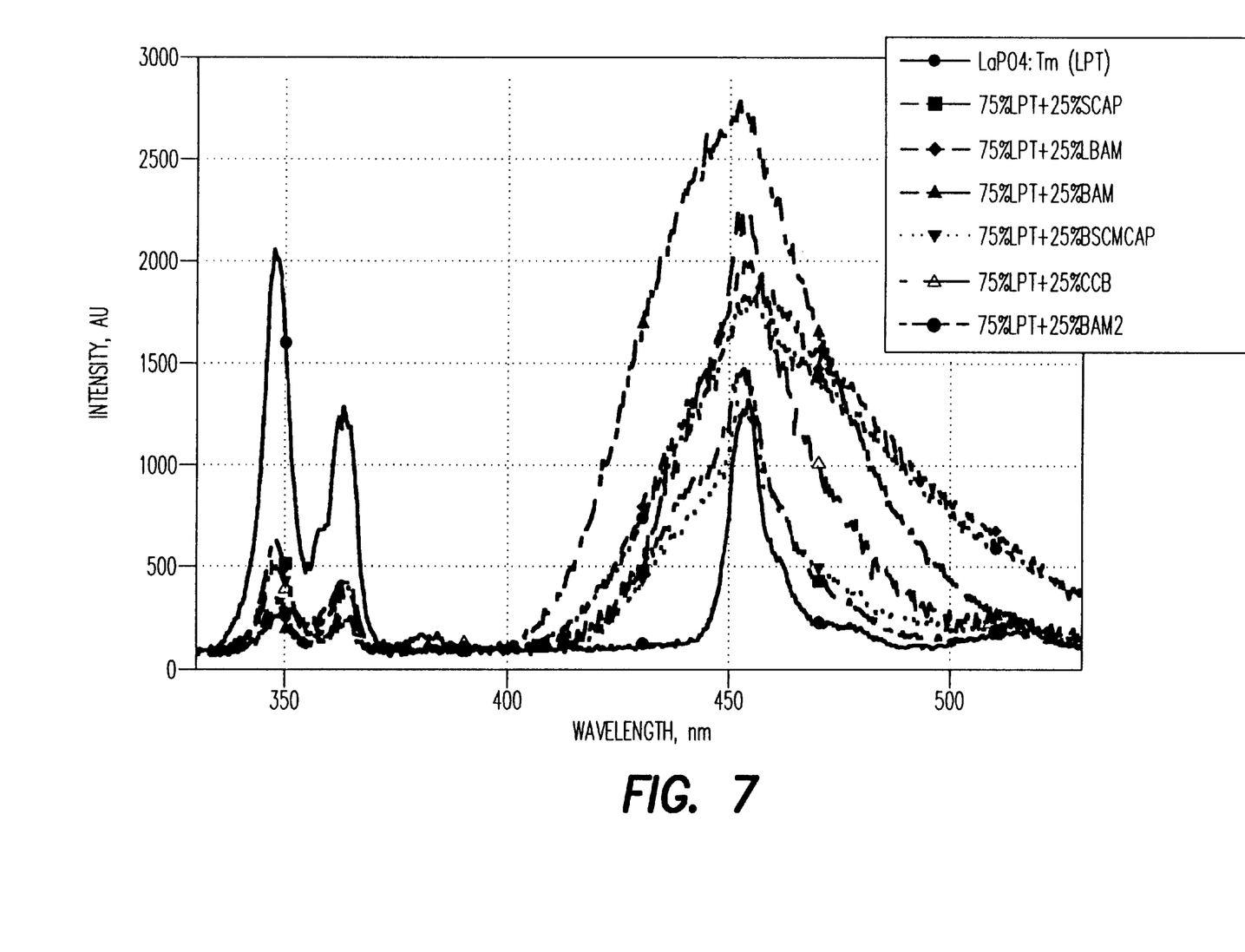
FIG. 7 shows the emission spectra of $LaPO_4$:Tm,Li (LPT) and phosphor blend made out of 75% of LPT and 25% of di-valent europium activated either $BaMgAl_{10}O_{17}$ (BAM) or $BaMg_2Al_{16}O_{27}$ (BAM2) or $BaMgLaAl_9O_{17}$, (BLMA) or $Sr_5(PO_3)_3Cl$ (SCAP) or $(Sr,Ca,Ba,Mg)_5(PO_4)_3Cl$ (BSCMCAP) or $Ca_5B_5O_9Cl$ (CCB) at 173 nm excitation.

Phosphor samples were exposed to different custom made Xenon lamps, optimized for either 147 or 173 nm, with a $MgF_2$ window and suitable bandpass filters. The emission spectra of the phosphor blends containing 25% of a BAM or BLMA or AECP or CCP and 75% of $Tm^{3+}$ activated lanthanum phosphate are shown in FIGS. 6 and 7. Shown are emission spectra of the following BLMAs: BAM ($BaMgAl_{10}O_{17}$), BAM2 ($BaMg_2Al_{16}O_{27}$), LBAM ($BaMgLaA_9O_{17}$) and AECAPs including SCAP ($Sr_5(PO_3)_3Cl$ and BSCMCAP (($Sr,Ca,Ba,Mg)_5(PO_4)_3Cl$)) and CCB ($Ca_5B_5O_9Cl$). All weight percentages are based on the total weight of the phosphor. The spectral response of grating and photo-multiplier tube (PMT) in UV region (300 to 400 nm) is about 65% when compared to the response in the visible region (400 to 700 nm).

FIGS. 6 and 7 show that $Tm^{3+}$ activated LPT phosphor emitted three narrow peaks at 348 nm (UV), 363 nm (UV) and 451 nm (Visible) when excited with a Xe-light source (147 nm or 172 nm). When LPT was blended with any of the above-mentioned $Eu^{2+}$ activated phosphor, the intensity of the UV peaks was reduced, whereas the intensity of the visible peak was enhanced. The UV energy emitted by LPT phosphor was absorbed by $Eu^{2+}$ activated phosphor and emitted in the visible (around 450 nm).

EXAMPLE V

For this example, $Eu^{2+}$ activated strontium chloro apatite (SCAP) was selected as one of the alkaline earth chloro apatites (AECAP). The coating of a thin layer of $Eu^{2+}$ activated strontium chloro apatite on a $Tm^{3+}$ activated LPT phosphor is described in this example. 14.55 grams of strontium chloride and 0.6 grams of europium chloride were dissolved in 5 liters of hot water (95° C.). The solution was acidified by adding 10 cc of 0.5M hydrochloric acid. After adding 150 cc of trimethyl phosphate solution (from above stock solution) to metal chloride solution, the mixture was refluxed for 24 hours at 100° C. The solution was left at room temperature for a few days or until it became (500 cc) a semi gel.

43.1 grams of a LPT ($Tm^{3+}$) phosphor (particle sizes in the 1.0 to 2.0 micron range) was added to the semi gel and rolled on a slow moving roller in an open jar for several days until it became a powder (phosphor particles coated with a xerogel). The powders were transferred into a high grade alumina boat and subjected to two heat cycles. In the first heat cycle, the sample was soaked for 2 to 4 hours at 350° C. and then heated to 900 to 1000° C. for 2 to 12 hours in air. After crushing the powders, the mass was reheated at 1000° C. for 2 to 4 hours in the presence of forming gas (4.5% $H_2$ and remaining $N_2$). After cooling to room temperature, the fine powders were then washed with deionized water and dried at 100° C. for 4 to 6 hours. After washing, the resultant powder was subjected to spectral and lifetime measurements.

EXAMPLE VI $Eu^{2+}$ activated barium magnesium aluminate (BAM) is selected for this example. The coating of a thin layer of $Eu^{2+}$ activated BAM on a $Tm^{3+}$ activated LPT phosphor is described in this example. 20.4 grams of aluminum isopropoxide was dissolved in 5 liters of hot water (95° C.). The solution was acidified by adding 5 cc of 0.5M nitric acid. After adding 2.17 grams of barium nitrate, 1.4 grams of magnesium nitrate and 0.04 grams of europium nitrate, the mixture was refluxed for 24 hours at 110° C. The solution was left at room temperature for a few days or until it became (500 cc) a semi gel. The remaining procedure of adding LPB, rolling, drying, heating, cooling and washing is the same as descried in Example V.

EXAMPLE VII

The coating of a thin layer of $Eu^{2+}$ activated barium magnesium lanthanum aluminate (BLMA) on a $Tm^{3+}$ activated LPT phosphor is described in this example. 10.2 grams of aluminum isopropoxide was dissolved in 5 liters of hot water (95° C.). The solution was acidified by adding 5 cc of 0.5M nitric acid. After adding 21.65 grams of lanthanum nitrate, 21.7 grams of barium nitrate, 1.4 grams of magnesium nitrate and 0.04 grams of europium nitrate, the mixture was refluxed for 24 hours at 110° C. The solution was left at room temperature for a few days or until it became a semi gel. The remaining procedure of adding LPB, rolling drying, heating, cooling and washing is the same as described in Example V.

EXAMPLE VIII

The blending of $Eu^{2+}$ activated blue emitting phosphors such as BAM, BLMA, AECP or CCP with $Tm^{3+}$ activated LPT phosphor is described in this example. 25 grams of BLMA, with particles in the range 1 to 2 microns was mixed thoroughly with 75 grams of $Tm^{3+}$ activated LPT of the same particle size. The resultant blend was fired at 350° C. for 60 minutes and used to measure spectral and lifetime measurements.

TABLE X

| Phosphor | Excitation WL (nm) | Relative Intensity (AU) @ 347 nm | Relative Intensity (AU) @ 452 nm | Color Coordinates x | Color Coordinates y |
|---|---|---|---|---|---|
| NTSC | — | — | — | 0.1400 | 0.0800 |
| $[LPO_4]_{1.0}$ | 147 | 3615 | 1410 | 0.1430 | 0.0407 |
| $[LPO_4]_{0.75}$ + $[BAM]_{0.25}$ | 147 | 931 | 3600 | 0.1458 | 0.0462 |
| $[LPO_4]_{1.0}$ | 173 | 3077 | 1176 | 0.1461 | 0.0304 |
| $[LPO_4]_{0.75}$ + $[BAM]_{0.25}$ | 173 | 308 | 2700 | 0.1462 | 0.0421 |

The data of Table X provides the intensity and color coordinates of $Tm^{3+}$ activated lanthanum phosphate based phosphors with and without BAM.

The phosphor complex/blend of the invention has a narrow band emission in blue region, peaking at 452 nm when excited by 147 or 173 nm radiation from a Xenon gas mixture. The phosphor blend obtained by the present method, exhibits uniform and spherical shape particles in the range 1 to 2 microns, and is appropriate for thin phosphor screens required for a variety of flat panel display and lamp applications. The phosphor complex/blend also exhibits better stability (lifetime) when excited with 147 and 173 nm radiation than the currently available commercial phosphors for plasma display panels.

It should be understood that the foregoing description is illustrative only of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A phosphor comprising:
    lanthanum phosphate phosphor with $Tm^{3+}$ as an activator and $Li^+$ and an optional amount of a coactivator having one alkaline earth element ($AE^{2+}$) and having the empirical formula:

$(La_{1-x-y-z}Tm_xLi_yAE_z)PO_4$ wherein: 0.001<x<0.05, 0.01<y<0.05, and 0<z<0.05; and 15 to 30% by weight of barium, magnesium, aluminate (BAM), having an empirical formula:

$(Ba_{1-x}Eu_x)O.Mg_yO.(Al_2O_3)_z$ wherein 0.005<x<0.05, 1<y<2 and 5<z<7.

2. The phosphor as recited in claim 1, wherein said BAM is present in a percentage range of 18% to 25%.

3. A phosphor comprising:
    lanthanum phosphate phosphor with $Tm^{3+}$ as an activator and $Li^+$ and an optional amount of an alkaline earth element ($AE^{2+}$) as a coactivator, having the empirical formula:

$(La_{1-x-y-z}Tm_xLi_yAE_x)PO_4$ wherein: 0.001<x<0.05, 0.01<y<0.05, and 0<z<0.05; and 15%–30% by weight of barium, magnesium, lanthanum aluminate (BLMA), having an empirical formula:

$(Ba_{1-x}Eu_x)O \cdot Mg_yO \cdot (Al_{2-v}La_vO_3)_z$ wherein $0.005 < x < 0.05$, $1 < y < 2$, $5 < z < 7$ and $0.1 < v < 1$.

4. The phosphor as recited in claim 3, wherein said BLMA is present in a percentage range of 18% to 25%.

5. A phosphor comprising:
lanthanum phosphate phosphor with $Tm^{3+}$ as an activator and $Li^+$ and an optional amount of an alkaline earth element ($AE^{2+}$) as a coactivator, having the empirical formula:

$(La_{1-x-y-z}Tm_xLi_yAE_z)PO_4$ wherein: $0.001 < x < 0.05$, $0.01 < y < 0.05$, and $0 < z < 0.05$; and 15% to 30% by weight of di-valent, europium activated alkaline earth chloro apatite (AECAP) having an empirical formula:

$AE_5(PO_4)_3Cl$ wherein AE is comprises at least one of Sr, Ca, Ba, Mg.

6. The phosphor as recited in claim 5, wherein said AECAP is present in a percentage range of 18% to 25%.

7. A phosphor comprising:
lanthanum phosphate phosphor with $Tm^{3+}$ as an activator and $Li^+$ and an optional amount of an alkaline earth element ($AE^{2+}$) as a coactivator, having the empirical formula:

$(La_{1-x-y-z}Tm_xLi_yAE_z)PO_4$ wherein: $0.001 \leq x \leq 0.05$, $0.01 \leq y \leq 0.05$, and $0 \leq z \leq 0.05$; and
15% to 30% by weight of di-valent, europium activated calcium chloro borate (CCB) having an empirical formula:

$(Ca_{5-x}Eu_x)B_5O_9Cl$ wherein $0.005 \leq x \leq 0.05$.

8. The phosphor as recited in claim 7, wherein said CCB is present in a percentage range of 18% to 25%.

9. A method for forming a phosphor complex, wherein the phosphor comprises lanthanum phosphate with $Tm^{3+}$ as an activator (hereafter "LPT phosphor"), Li and an optional amount of an alkaline earth element ($AE^{2+}$) as a coactivator, and having the empirical formula:

$(La_{1-x-y-z}Tm_xLi_yAE_z)PO_4$ wherein: $0.001 < x < 0.05$, $0.01 < y < 0.05$, and $0 < z < 0.05$; and 15 to 30% by weight of di-valent europium activated barium, magnesium, aluminate (BAM), having an empirical formula:

$(Ba_{1-x}Eu_x)O \cdot Mg_yO \cdot (Al_2O_3)_z$ wherein $0.005 < x < 0.05$, $1 < y < 2$ and $5 < z < 7$; said method comprising the steps of:
a) coating on said LPT phosphor, a thin layer of a gel obtained by refluxing aluminum isopropoxide, europium nitrate, barium nitrate and magnesium nitrate in a presence of nitric acid;
b) drying the LPT phosphor coated in step a); and
c) thermally decomposing the coated LPT phosphor in a forming gas to create an LPT/BAM phosphor complex.

10. The method as recited in claim 9, wherein step b) subjects said coated LPT phosphor to about 350° C. for 2 to 4 hours and then 900° C. to 1000° C. for 2 to 12 hours in air.

11. The method as recited in claim 9, wherein step c) subjects said coated LPT phosphor to about 1000° C. for 2 to 4 hours in the presence of forming gas.

12. A method for forming a phosphor complex, wherein the phosphor comprises lanthanum phosphate with $Tm^{3+}$ as an activator (hereafter "LPT phosphor"), $Li^+$ and an optional coactivator comprising an alkaline earth element ($AE^{2+}$), and having the empirical formula:

$(La_{1-x-y-z}Tm_xLi_yAE_z)PO_4$ wherein: $0.001 < x < 0.05$, $0.01 < y < 0.05$, and $0 < z < 0.05$; and
15% to 30% by weight of di-valent, europium activated alkaline earth chloro apatite (AECP) having an empirical formula:

$AE_5(PO_4)_3Cl$ wherein AE is comprises at least one of Sr, Ca, Ba, Mg; said method comprising the steps of:
a) coating on said LPT phosphor, a thin layer of a gel obtained by refluxing trimethyl phosphate, europium chloride and at least one of: barium chloride, magnesium chloride, strontium chloride and calcium chloride, in the presence of hydrochloric acid;
b) drying the LPT phosphor coated in step a); and
c) thermally decomposing the coated LPT phosphor in a forming gas to create an $Eu^{2+}$ activated chloro apatite phosphor complex.

13. The method as recited in claim 12, wherein step b) subjects said coated LPT phosphor to about 350° C. for 2 to 4 hours and then 900° C. to 1000° C. for 2 to 12 hours in air.

14. The method as recited in claim 12, wherein step c) subjects said coated PT phosphor to about 1000° C. for 2 to 4 hours in the presence of forming gas.

15. A method for forming a phosphor complex, wherein the phosphor comprises lanthanum phosphate with $Tm^{3+}$, as an activator (hereafter "LPT phosphor"), $Li^+$ and an optional coactivator comprising an alkaline earth element ($AE^{2+}$), and having the empirical formula:

$(La_{1-x-y-z}Tm_xLi_yAE_z)PO_4$ wherein: $0.001 < x < 0.05$, $0.01 < y < 0.05$, and $0 < z < 0.05$; and
15 to 30% by weight of di-valent europium activated barium, magnesium, lanthanum aluminate (BLMA), having an empirical formula:

$(Ba_{1-x}Eu_x)O \cdot Mg_yO \cdot (Al_{2-v}La_vO_3)_z$ wherein $0.005 < x < 0.05$, $1 < y < 2$, $5 < z < 7$ and $0.1 < v < 1$;
said method comprising the steps of:
a) coating on said LPT phosphor, a thin layer of a gel obtained by refluxing aluminum isopropoxide, europium nitrate, lanthanum nitrate, magnesium nitrate and barium nitrate in a presence of nitric acid;
b) drying the LPT phosphor coated in step a); and
c) thermally decomposing the coated LPT phosphor in a forming gas to create an LPT/BLMA phosphor complex.

16. The method as recited in claim 15, wherein step b) subjects said coated LPT phosphor to about 350° C. for 2 to 4 hours and then 900° C. to 1000° C. for 2 to 12 hours in air.

17. The method as recited in claim 15, wherein step c) subjects said coated LPT phosphor to about 1000° C. for 2 to 4 hours in the presence of forming gas.

* * * * *